US008725906B2

(12) United States Patent
Radovanovic

(10) Patent No.: US 8,725,906 B2
(45) Date of Patent: May 13, 2014

(54) SCALABLE DATA STORAGE ARCHITECTURE AND METHODS OF ELIMINATING I/O TRAFFIC BOTTLENECKS

(71) Applicant: Branislav Radovanovic, Weatogue, CT (US)

(72) Inventor: Branislav Radovanovic, Weatogue, CT (US)

( * ) Notice: Subject to any disclaimer, the term of this patent is extended or adjusted under 35 U.S.C. 154(b) by 10 days.

(21) Appl. No.: 13/731,854

(22) Filed: Dec. 31, 2012

(65) Prior Publication Data

US 2013/0145064 A1 Jun. 6, 2013

Related U.S. Application Data

(63) Continuation of application No. 11/292,838, filed on Dec. 2, 2005, now Pat. No. 8,347,010.

(51) Int. Cl.
*G06F 3/00* (2006.01)
(52) U.S. Cl.
USPC .......................................................... 710/2
(58) Field of Classification Search
USPC .......................................................... 710/2
See application file for complete search history.

(56) References Cited

U.S. PATENT DOCUMENTS

| 6,029,168 | A | 2/2000 | Frey |
| 6,427,212 | B1 | 7/2002 | Frey et al. |
| 6,530,036 | B1 | 3/2003 | Frey et al. |
| 6,820,171 | B1 | 11/2004 | Weber et al. |
| 7,127,633 | B1 | 10/2006 | Olson et al. |
| 7,225,317 | B1 | 5/2007 | Glade et al. |
| 7,228,391 | B2 | 6/2007 | Silvera et al. |
| 2002/0103889 | A1 | 8/2002 | Markson et al. |
| 2002/0103943 | A1 | 8/2002 | Lo et al. |
| 2003/0217310 | A1 | 11/2003 | Ebsen et al. |
| 2005/0289152 | A1 | 12/2005 | Earl et al. |
| 2006/0005076 | A1* | 1/2006 | Brown et al. .................... 714/11 |
| 2006/0029069 | A1* | 2/2006 | Frank et al. .................... 370/389 |

* cited by examiner

*Primary Examiner* — Idriss N Alrobaye
*Assistant Examiner* — Brooke Taylor
(74) *Attorney, Agent, or Firm* — Lathrop & Gage LLP

(57) ABSTRACT

A Storage Area Network (SAN) system has host computers, front-end SAN controllers (FE_SAN) connected via a bus or network interconnect to back-end SAN controllers (BE_SAN), and physical disk drives connected via network interconnect to the BE_SANs to provide distributed high performance centrally managed storage. Described are hardware and software architectural solutions designed to eliminate I/O traffic bottlenecks, improve scalability, and reduce the overall cost of SAN systems. In an embodiment, the BE_SAN has firmware to recognize when, in order to support a multidisc volume, such as a RAID volume, it is configured to support, it requires access to a physical disk attached to a second BE_SAN; when such a reference is recognized it passes assess commands to the second BE_SAN. Further, the BE_SAN has firmware to make use of the physical disk attached to the second BE_SAN as a hot-spare for RAID operations.

7 Claims, 11 Drawing Sheets

Storage Area Network (SAN) with multiple controllers with distributed data access architecture

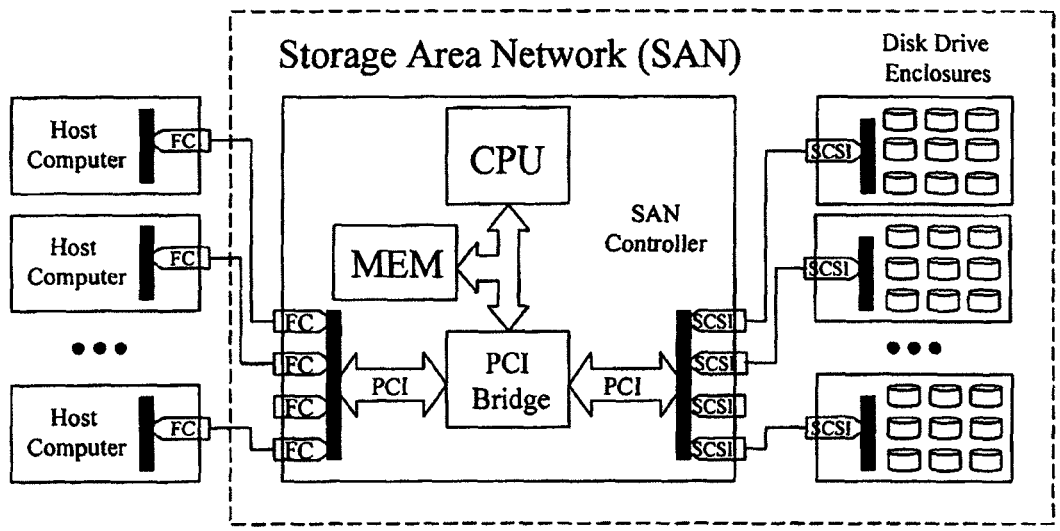
FIG. 1A Storage Area Network (SAN) with single controller utilizing SCSI disk drives
PRIOR ART
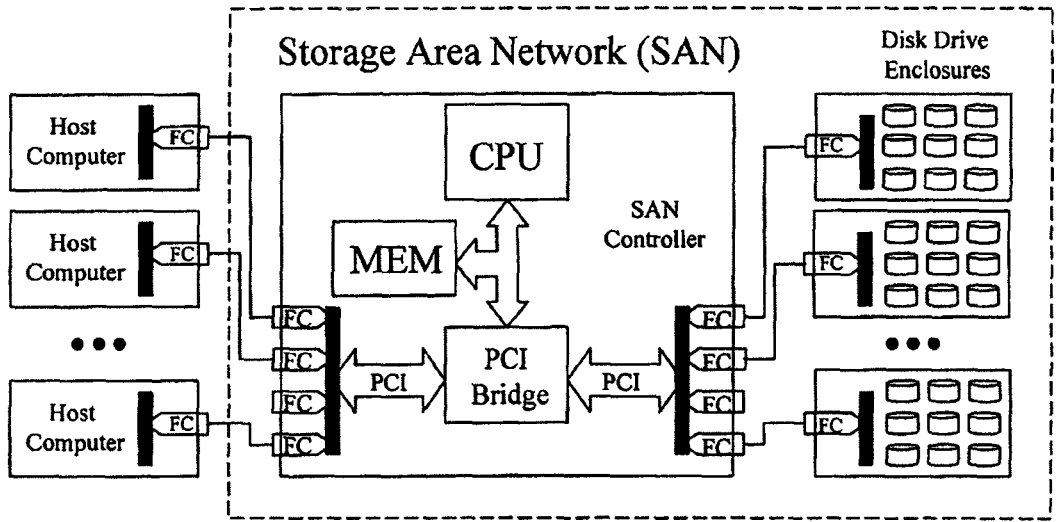
FIG. 1B Storage Area Network (SAN) with single controller utilizing FC disk drives
PRIOR ART

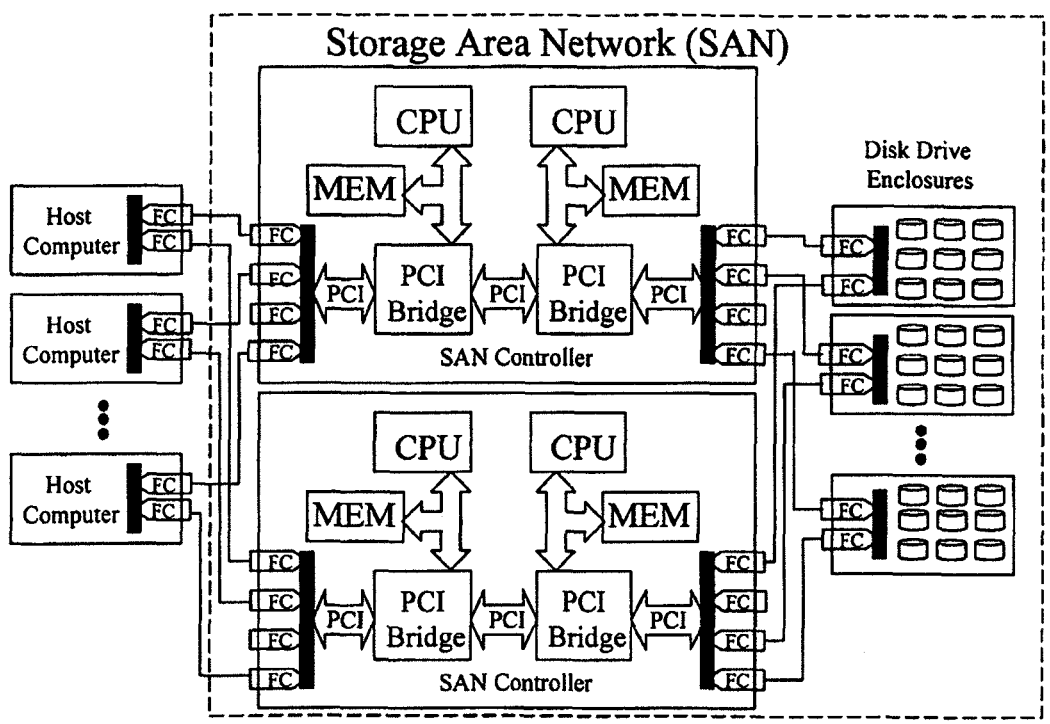
FIG. 2 Storage Area Network (SAN) with dual controller utilizing FC disk drives
PRIOR ART

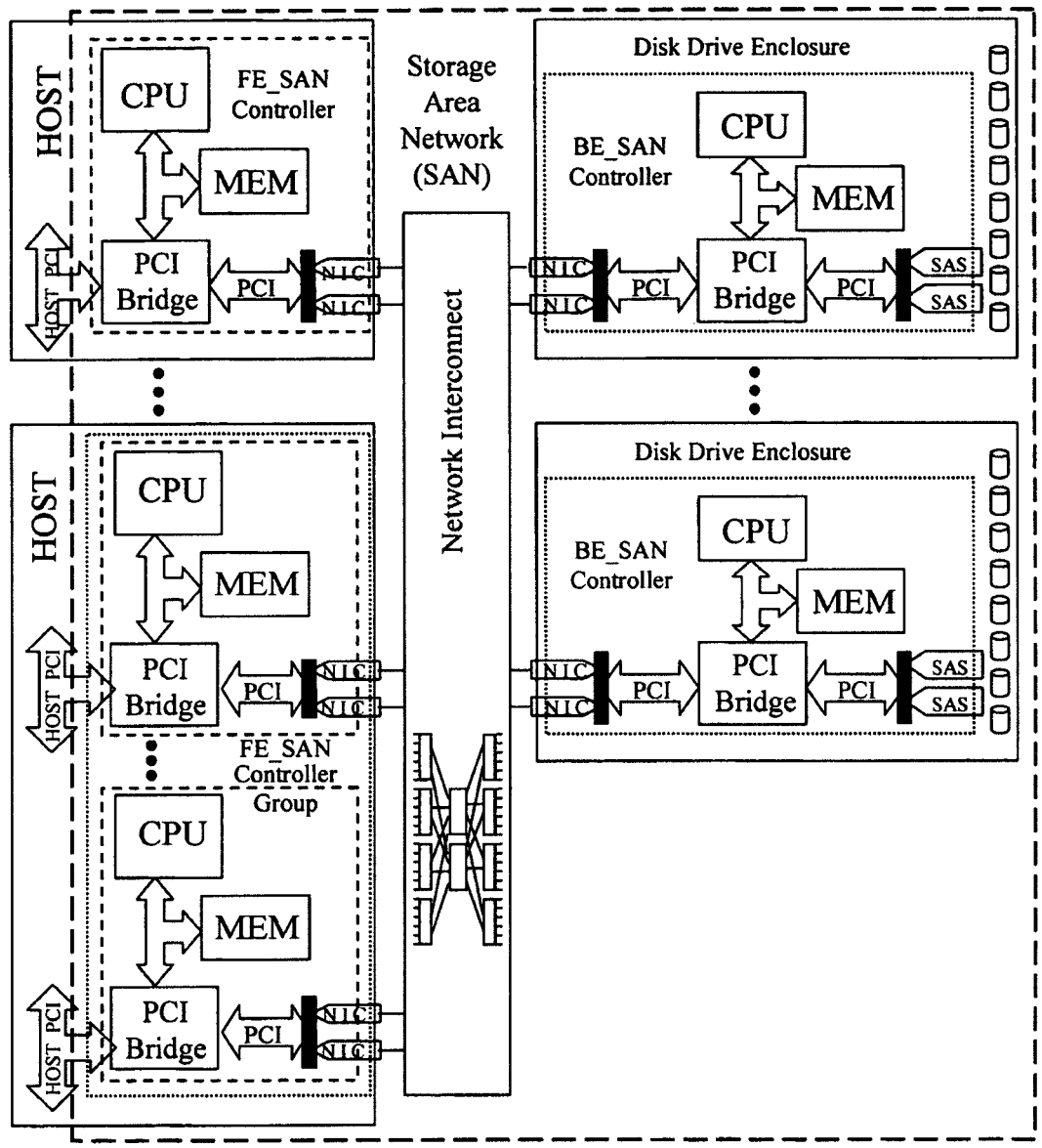
FIG. 3 Storage Area Network (SAN) with multiple controllers with distributed data access architecture

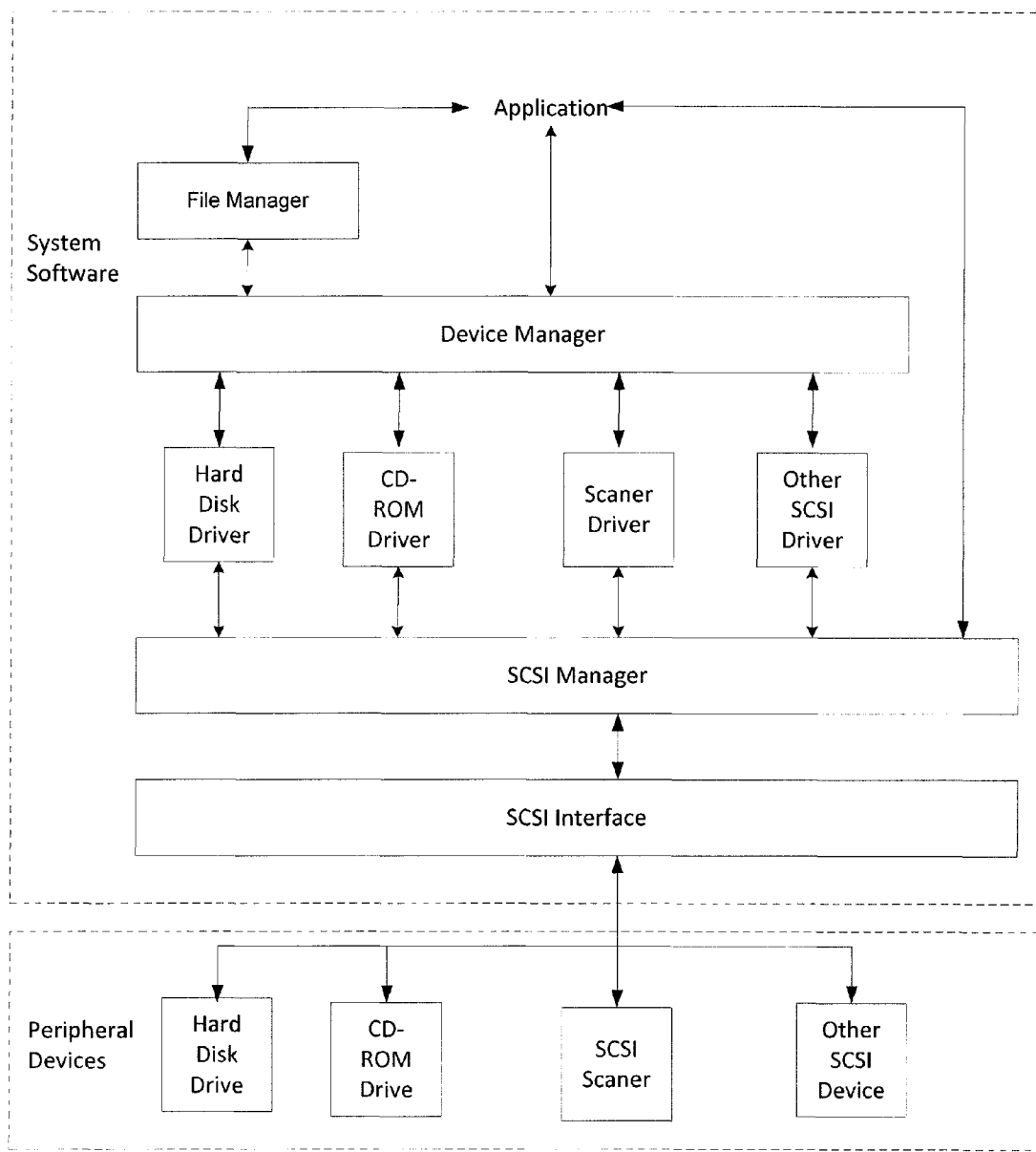
FIG. 4 System view of I/O related layers to access SCSI devices
PRIOR ART

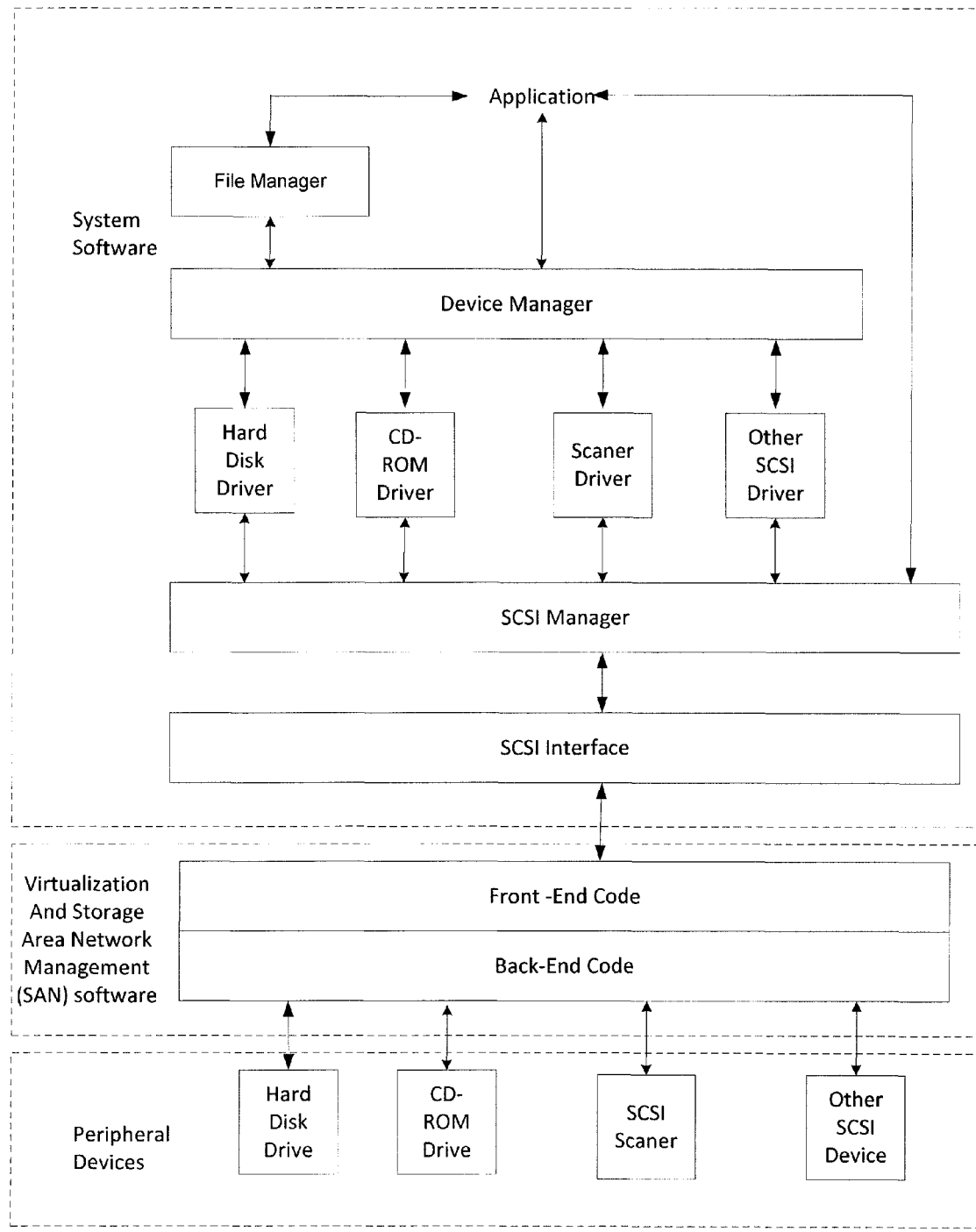
FIG. 5A System view of I/O related layers to access SCSI devices over Storage Area Networks (SAN)
PRIOR ART

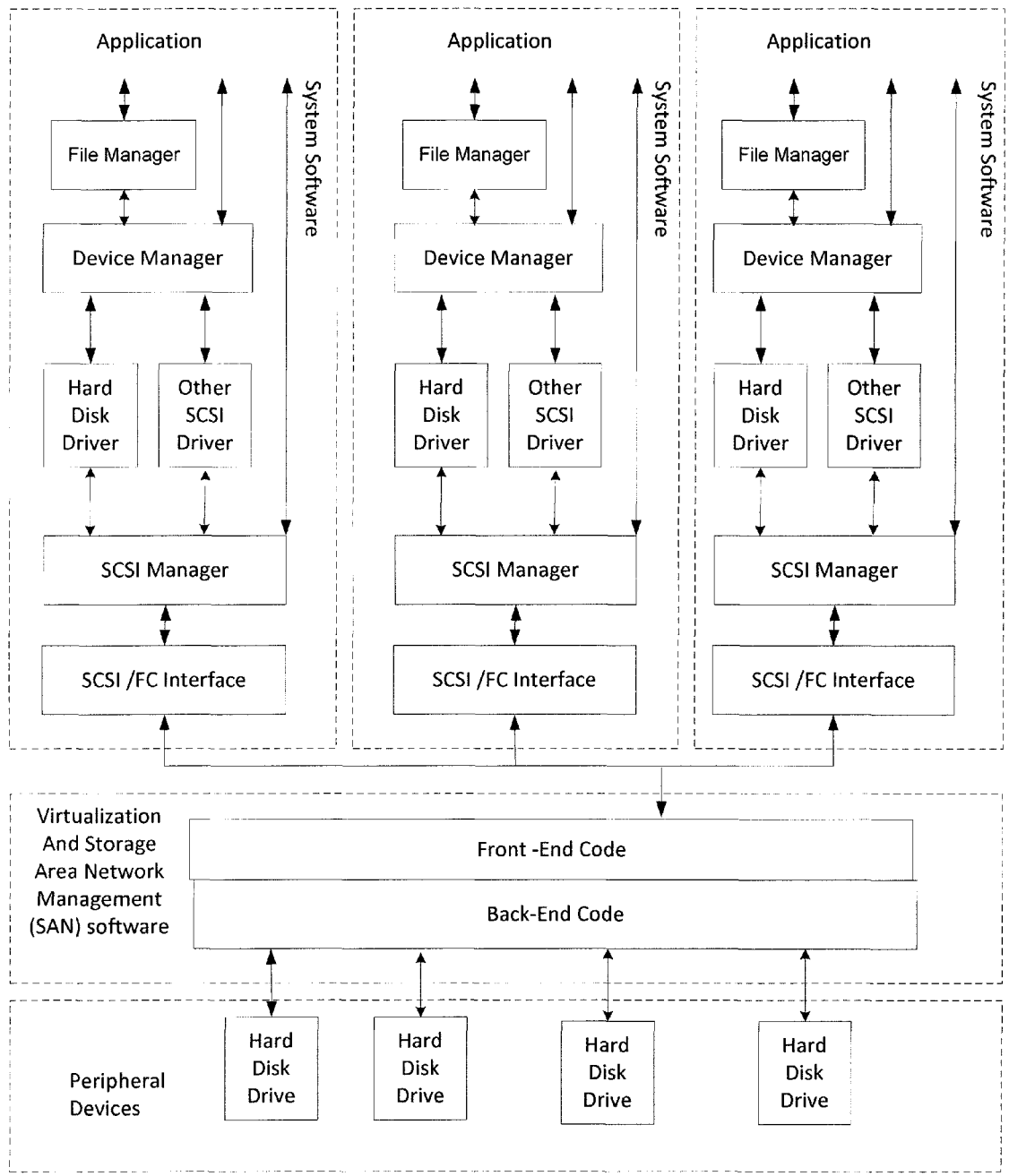
FIG. 5B System view of I/O related layers to access SCIS devices over Storage Area Networks (SAN)
PRIOR ART

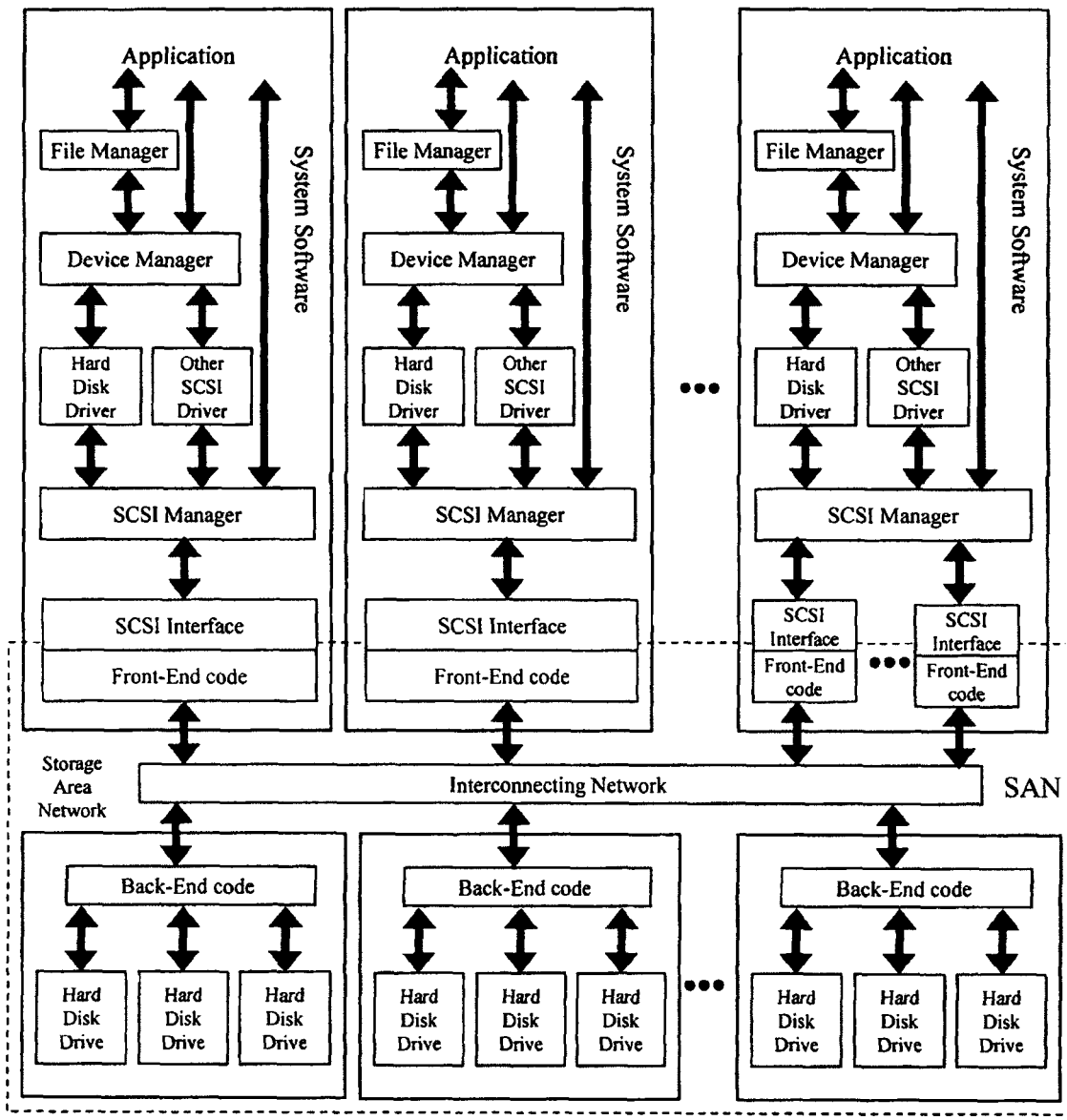
FIG. 6 System view of I/O related layers to access SCSI devices over Storage Area Networks (SAN)

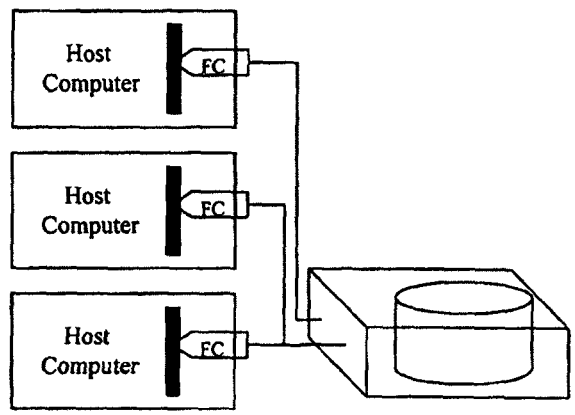
FIG. 7A Single disk drive provides reservation and persistent reservation
PRIOR ART
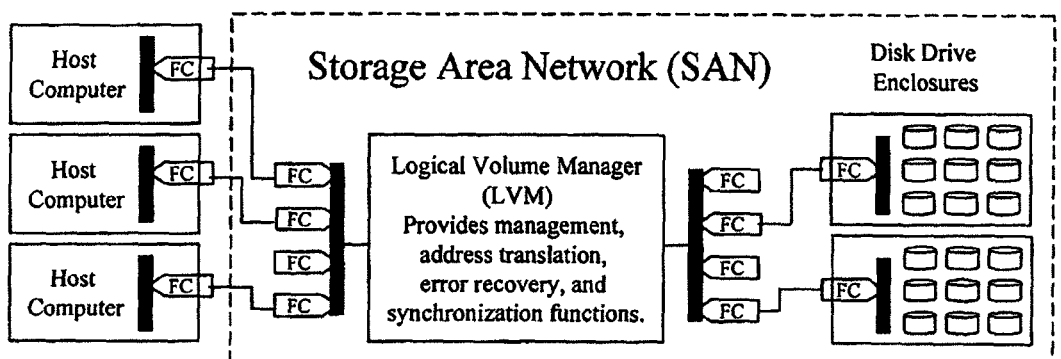
FIG. 7B Monolithic Logical Volume Manager (LVM) provides reservation and persistent reservation
PRIOR ART

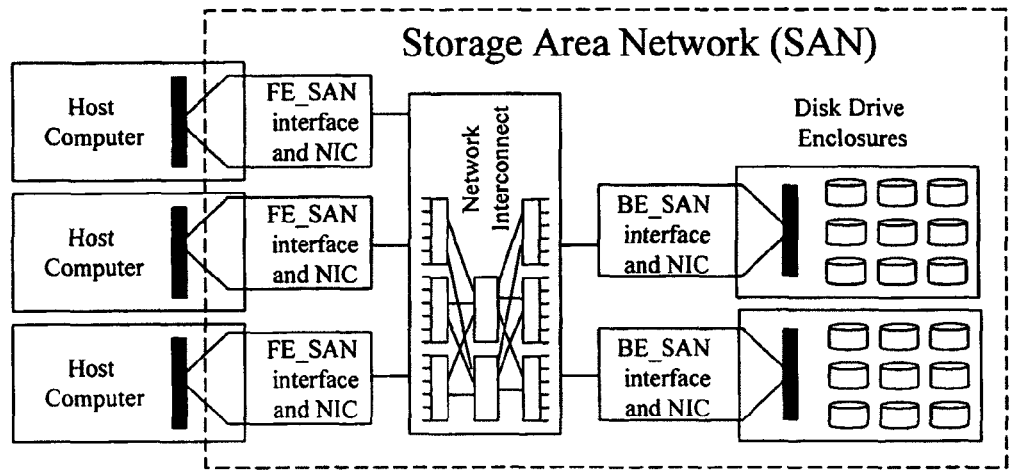

FIG. 8A The architecture described in the invention uses distributed (over the network) Logical Volume Manager (LVM) providing reservation and persistent reservation and other locking mechanisms.

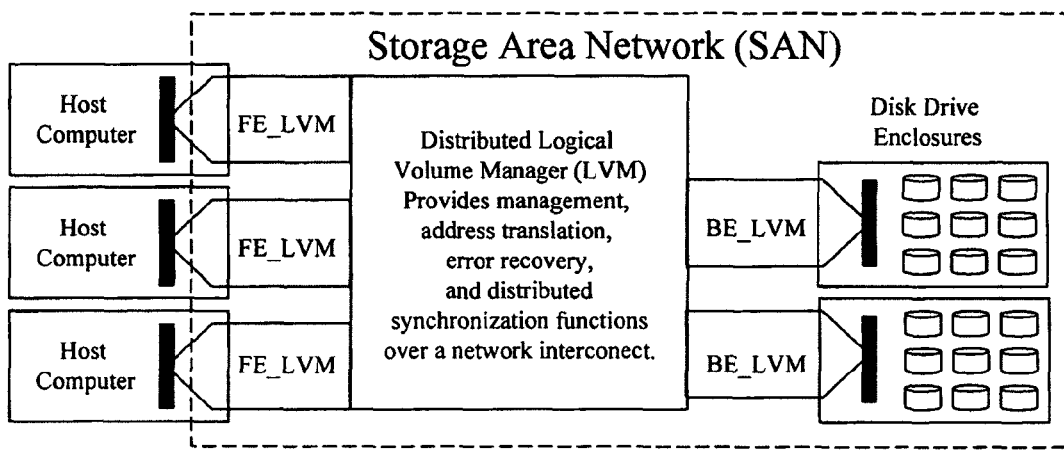

FIG. 8B Front-End LVMs (FE_LVMs) run independently from each other and allocate resources as needed from the Back-End LVMs (BE_LVMs) thus providing exclusive access to the allocated Logical Block Addresses

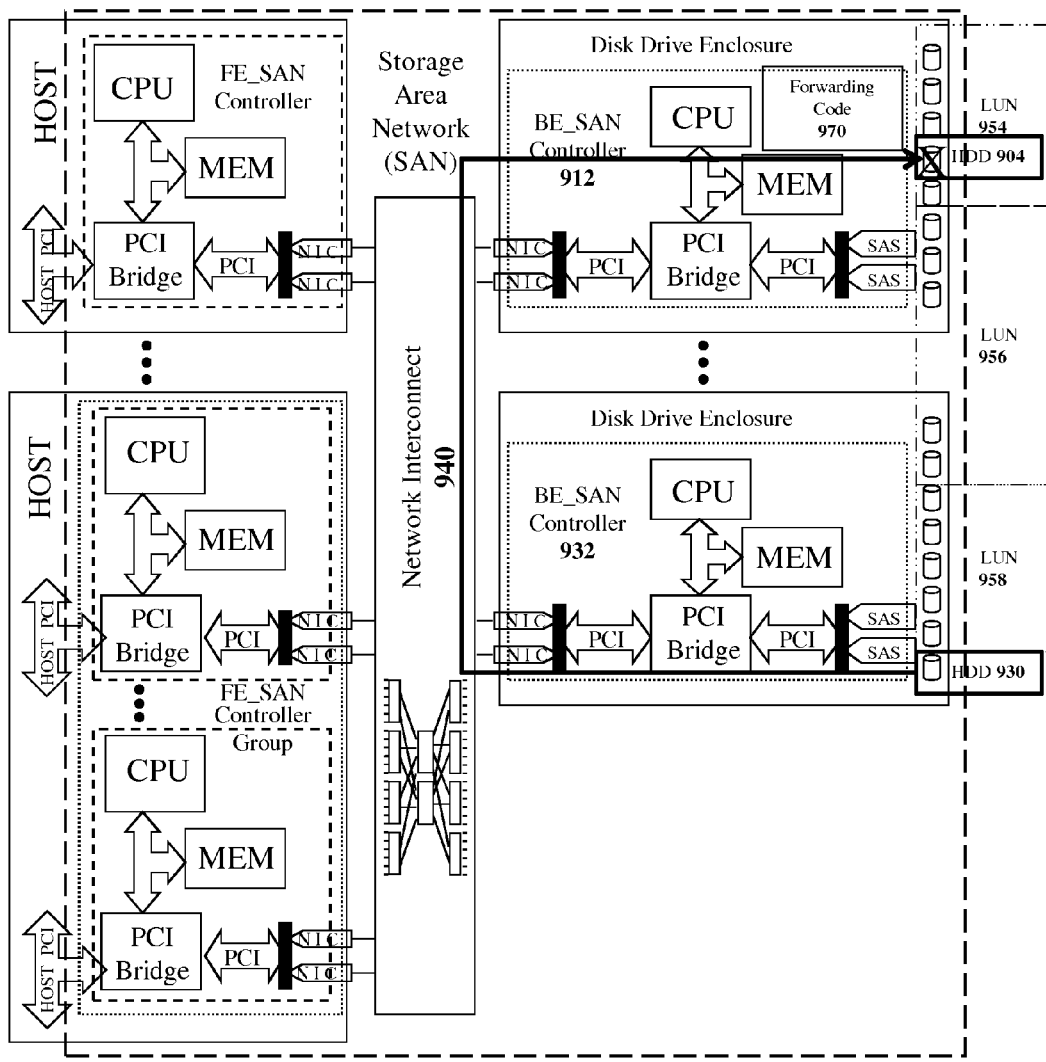
FIG. 10 Storage Area Network (SAN) with Remote Hot-Spare Volume/HDD

SCALABLE DATA STORAGE ARCHITECTURE AND METHODS OF ELIMINATING I/O TRAFFIC BOTTLENECKS

RELATED APPLICATIONS

This application is a continuation-in-part of U.S. patent application Ser. No. 11/292,838, filed 2 Dec. 2005, and issuing Jan. 1, 2013, the disclosure of which is incorporated herein by reference.

BACKGROUND OF THE INVENTION

This invention relates generally to the field of storage RAID controllers and Storage Area Network (SAN) systems. Mainly to improving data access speeds by facilitating massively parallel data access by separating Front-End and Back-End software functionality. Thus, executing appropriate code concurrently on separate Front-End Storage Area Network (FE_SAN) and Beck-End Storage Area Network (BE_SAN) controllers connected via high-speed network (switched fabric such as Advanced Switching (AS), Infiniband, Serial Attached SCSI (SAS), Fibre Channel (FC), Myrinet, etc.).

As ever-increasing demand for more data hence, for more data storage, SAN and RAID technologies available today have failed to meet performance requirements and with prohibitively high cost made them out of reach for the majority of the small and some medium size businesses. By utilizing this enabling scalable technology that uses, mostly, of the shelf components to bring the cost down and it is specifically designed to extend system capabilities and eliminate I/O bottlenecks. The majority of small and medium businesses should be able to afford such entry-level systems (with few FE_SAN and BE_SAN controllers) and add more controllers for more capacity and performance as they grow.

A majority of small and some medium size businesses and corporations, recognizing the productivity gains resulting from high-performance and high availability computing systems are often unable to acquire suchlike systems due to prohibitively high cost of data storage subsystems. To reduce the cost they often utilize large number of disjoint individual servers where each server is dedicated to one or more specific applications, such as mail servers, accounting packages, etc. This environment, clearly, leads to underutilized available aggregate computing power of all servers since each server is dedicated to specific application and the workload cannot be shared. This approach introduces other issues such as system and network administration, fault tolerance, fragmented data storage, data storage and backup management problems, as well as system complexity, and so forth. Data access and data sharing could be done at different levels such as block access (shared storage), multiple hosts accessing the same disk drives or Logical Unit Numbers (LUNs), or using file systems like Network File System, Common Internet File System, etc.

A Network File System (NFS) is a client/server application that facilitates viewing and optionally storing and updating files stored on a remote computer (often called file server). The client system, which may be a work station or cluster node, has to run an NFS client and the other computer, file server, needs the NFS server software. Both computers typically must have networking protocol software such as Transmission Control Protocol/Internet Protocol (TCP/IP) and networking hardware such as Ethernet, InfiniBand, Myrinet, or other Network Interface Cards (NICs) installed, since the NFS server and NFS client use network protocols to send the files and updates back and forth. This approach leads to a bandwidth bottleneck on both client and file server sides due to NFS protocol overhead, limited Peripheral Component Interconnect (PCI) bus data rate, and possibly high latency associated with traditional architecture of the data storage subsystem attached to it.

A protocol standard developed by Microsoft, Common Internet File System (CIFS), that allows programs to make requests for files and services located on remote computer facilitates the same basic function as previously mentioned NFS. CIFS is typically utilized in Microsoft operating system environments to allow shared access from one computer to files stored on another remote computer within the same network. A CIFS client makes a request to a CIFS server (usually in another computer) for a file access or to pass a message. The server executes requested action and returns a response. CIFS is a public version of the Server Message Bock (SMB) protocol. The file server running CIFS suffers from the same problems as earlier mentioned NFS server because, this is in essence the same or similar hardware and technology. This clearly reveals the need to get data (disk storage) as close as possible to host CPU (memory).

TCP/IP protocol overhead together with network latency affects the performance of NFS/CIFS subsystems by significantly increasing access delays for network-attached disk when compared to locally attached disk. However, locally attached disk performance, usually, is much worse compared to data storage subsystem implementations such as RAID or Storage Area Network (SAN) subsystem. Traditional SAN design and implementation even though in many cases superior to locally attached disk drives, underutilize aggregate data rate potential of all attached disk drives by making use of time division multiplexing over typically small number of I/O (network) links between servers and the SAN subsystem attached to it.

To achieve the best performance with today's SAN technology every server or cluster node should be connected directly or through a rearrangeably non-blocking switched fabric to the SAN subsystem. The SAN subsystem should be able to support the sum of data rates on all links between the servers (or cluster nodes) and the SAN subsystem without significantly increasing the command queue size (the number of outstanding requests in the queue waiting to be executed). However, the architectural designs (hardware and software) of today's SAN subsystems create bottlenecks in the SAN controllers due to insufficient aggregate bandwidth and limited scalability. Even though Fibre Channel is designed with the intent to allow similar architectures, the protocol complexity and prohibitively high cost of the FC technology (HBAs and FC switches) effectively prevented significant progress in the field of data storage.

SUMMARY OF THE INVENTION

A number of industry trends created the opportunity and the need for the subject invention. As relatively inexpensive servers and computer cluster systems became widely accepted by the industry as a valuable alternative to expensive main frames (high-end multiprocessor systems) and supercomputers, the need to make storage subsystems more affordable became more important than ever. Since the amount of data generated in the world doubles every two to three years it is clear that some kind of high-performance tiered scalable architecture is needed to meet growing need for the data storage. However, it is not enough just to increase the storage capacity but at the same time to transparently improve the system performance, data transfer speeds and reduce latencies.

More particularly now, the present invention is an improvement over the existing data storage architectures by means of allowing parallel execution of the Front-End code on the independent FE_SAN controllers and employing locking mechanism in the Back-End code (executed on the BE_SAN controllers) to enforce data coherency and prevent data corruption.

In a preferred embodiment, the FE_SAN controllers accept all Small Computer System Interface (SCSI) commands, messages, and data for Front-End processing. The resulting output is forwarded to their intended BE_SAN controllers over the interconnecting network. Any network topology is allowed. From the BE_SAN controllers the SCSI commands, data, and messages after Back-End processing are forwarded to the anticipated SCSI targets (disk drives) or other storage or memory resident "devices". Neither SCSI target devices (disk drives) nor initiators (host computers) are aware of the underlying transport or FE_SAN and BE_SAN controllers. Hosts would perceive a "virtual" disk drive (or drives) attached to the FE_SAN (one or more) controllers. FE_SAN controllers could be configured as a controller group to share the load (command and message processing), enhancing the available bandwidth, and improving availability. In such cases, the host would have a notion of a single multi-channel controller attached to it.

A number of different storage interfaces may be supported at the back-end controller with this invention, including standard devices such as SCSI, SAS, Advanced Technology Attachment (ATA), Serial ATA (SATA), FC, and other similar disk storage as well as PCI Express (PCIe), Hyper Transport (HT), etc. interfaces.

The FE_SAN interface card (FE_SAN controller) may be provided in different physical formats, PCI, PCI-X, PCIe, or SBus interface board formats. Each FE_SAN interface card has firmware (software) that provides SCSI device discovery, error handling and recovery, and some RAID functionality. The back-end may be provided in a number of different physical formats such as in the standard disk drive enclosure format (including 19 inch rack and standalone enclosures), or an integrated circuit that is easily adaptable to the standard interior configuration of a SAN controller.

Each BE_SAN controller has firmware (software) that provides SCSI device discovery, fault management, RAID functionality, access to the portions of the physical disk locking methods, RDMA capability, and error handling functionality. The firmware on each BE_SAN controller (interface) provides all the functionality necessary to interface target disk storage interface such as SCSI, SAS, ATA, SATA, or FC disk drives or other data storage devices.

In an embodiment, the BE_SAN has firmware to recognize when, in order to support a multidisc volume, such as a RAID volume, it is configured to support, it requires access to a physical disk attached to a second BE_SAN; when such a reference is recognized it passes assess commands to the second BE_SAN. Further, the BE_SAN has firmware to make use of the physical disk attached to the second BE_SAN as a hot-spare for RAID operations.

BRIEF DESCRIPTION OF THE DRAWINGS

The foregoing and other objects, features and advantages of the invention will be apparent from the following more comprehensive description of preferred embodiments of the invention, as illustrated in the accompanying drawings in which like reference characters refer to the same parts throughout the different views. The drawings are not necessarily to scale, emphasis instead being placed upon illustrating the principles of the invention.

FIGS. 1A and 1B illustrate, respectively, typical low-end to mid-range SAN architecture that utilizes SCSI bus or FC network to transport commands and data between host and a data storage subsystem (SAN). Such SAN controller supports multiple virtual volumes (LUNs) creating an illusion that there are many independent high performance disks providing improved reliability and performance compared to a single disk drive. Both Front-End and Back-End code run on the same SAN controller providing as much bandwidth as such hardware and loaded firmware (software) sustains. Traffic from all the hosts (servers) is serviced by the controller. If I/O traffic exceeds controller-processing capability, all new requests will cause command queue to grow creating a performance bottleneck. This legacy solution does not scale well since there is no option of scaling the processing power by adding more controllers, if it is needed.

FIG. 2 illustrates improved SAN architecture; to improve the speed Front-End code (host specific functionality, virtual volume management, etc.) is executed on the Front-End CPU while Back-End code is executed on the Back-End CPU. A virtual volume (LUN) could be accessed through one SAN controller only while the other controller(s) are used to host other LUNs. Incoming requests, data structures, command queues, and data cache are mirrored through the Back-End FC connections to support transparent fail-over in case that the either (but not both) SAN controller fails. There are other similar implementations where controllers are connected via dedicated bus thus allowing faster controller synchronization. Both previously motioned approaches suffer from lack of scalability to thousands or even hundreds of controllers thus the inability process the requests to the same LUN concurrently on the different controllers.

FIG. 3 illustrates new approach to SAN architecture; to improve the speed Front-End code (host specific functionality, virtual volume management, etc.) is executed on the Front-End CPU concurrently, in other words, multiple instances of the same code run independently on all FE_SAN controllers. Back-End code is executed on the Back-End CPU, independently of the other Back-End code instances executed on different BE_SAN controllers. The Back-End code provides RAID functionality, error recovery, locking mechanism to ensure data integrity, etc. It is apparent that this architecture has tremendous potential to scale to very large number (tents or even hundreds of thousands) of both FE_SAN and BE_SAN controllers creating exceptional aggregate bandwidth. In various simulations, no I/O bottlenecks are observed regardless of the number of the host computers attached to the SAN.

FIG. 4 shows a system view of I/O related layers to access SCSI devices using standard SCSI interface;

FIGS. 5A and 5B is a system view of I/O related layers to access virtual volume (LUN) via traditional RAIDs or Storage Area Networks; The host has notion of being, attached to an ordinary SCSI device (disk drive or some other storage device). However, in reality, it sees only a virtual volume (LUN) that is spread across number of physical disk drives.

FIG. 6 is a system view of I/O related layers to access virtual disk (LUN) utilizing the new SAN architecture. Same as in traditional SAN solutions, the host has notion of having an ordinary SCSI device (disk drive) attached to it. The Front-End code creates a virtual device (virtual volume or LUN) that supports all (but not limited only to) mandatory SCSI commands. However, using the same method any other device could be emulated such as tape drive, DVD drive, etc. The main difference between Front-End codes used in FIG. 6 and in FIG. 5B is that in FIG. 6 there are many instances of the same Front-End code that are running on FE_SAN controllers simultaneously providing much higher processing power compared to the Front-End code used in FIG. 5B. Similarly, the Back-End code used in FIG. 6 runs in parallel providing the superior performance due to concurrent execution, compared to the Back-End code used in FIG. 5B. The key element is collaborative synchronization method between Front-End and Back-End code to ensure data integrity thus, allowing performance to scale with number of controllers.

Figure 9:
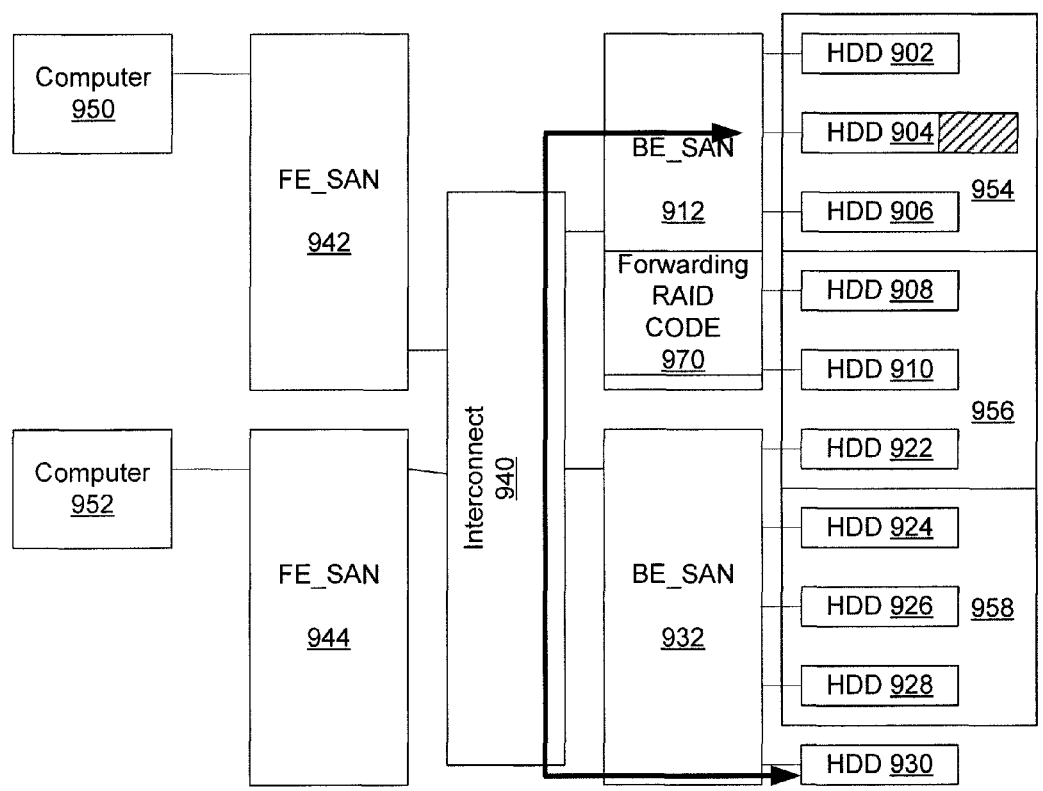

FIG. 7A illustrates single disk drive attached to the multiple initiators. FIG. 7B illustrates Storage Area Network system utilizing monolithic Logical Volume Manager (LVM) to emulate behavior of the single disk or multiple drives. In both cases, from FIGS. 7A and 7B, the synchronization is done by the hosts utilizing reservation, persistent reservation or other access control methods. This monolithic LVM could create the bottleneck during heavy I/O traffic.

FIGS. 8A and 8B illustrate, respectively, architectural changes to the system described in FIG. 7B (paragraph [0019]) by utilizing distributed (over the network) Logical Volume Manager (LVM) providing reservation and persistent reservation and other locking mechanisms. Front-End LVM (FE_LVM) instances run independently from each other and allocate resources as needed from the Back-End LVM (BE_LVM) instances thus, providing virtually exclusive access to the allocated Logical Block Addresses (LBAs). However, this does not necessarily limit data transfers only to a single data stream to those LBAs, which will be explained in the subsequent paragraphs. This architecture facilitates parallel execution of the FE_LVM and BE_LVM code eliminating the bottleneck and providing excellent scalability.

FIG. 9 illustrates virtual disks that span multiple disk drives, and which may span multiple BE_SANs, and where hot-spare storage devices substituted for failed storage devices in RAID-organized virtual disks may be coupled to a different BE_SAN than the failed disk.

FIG. 10 represents a system using a hot-spare disk on a second BE_SAN as a replacement for a RAID set implemented on a first BE_SAN.

DETAILED DESCRIPTION OF THE INVENTION

A description of one or more embodiments of the invention follows.

FIGS. 1A and 1B, illustrate legacy approach to Storage Area Network design and implementation. Such SAN controller supports multiple virtual volumes (LUNs) creating an illusion that there are many independent disks. Both Front-End and Back-End code run on the same SAN controller providing as much bandwidth as such implementation (hardware, firmware, or embedded software) allows. In addition, unusually, there is only one instance of code and data structures that handles particular virtual disk. Therefore, all I/O traffic associated with that particular virtual disk is handled by that code instance which could become a bottleneck in heavy I/O traffic conditions. Some solutions utilize shared memory architecture to improve I/O bandwidth. However, again, one single instance of the data structures has to be accessed creating opportunity for a bottleneck to occur. As motioned in the preceding paragraphs, this solution does not scale well since there is no option of scaling the processing power by adding more controllers.

FIG. 3, the present invention, illustrates the hardware architecture that enables parallel execution of the Front-End and Back-End code on the FE_SAN and BE_SAN controllers respectively. There are multiple instances of the Front-End code, preferably one or more per host or cluster node. Likewise, one or more BE_SAN controllers at the back-end execute Back-End code in parallel. FE_SAN and BE_SAN controllers are connected via interconnecting network, preferably via rearrangeably non-blocking Clos Network utilizing but not limited to inexpensive AS or Myrinet switches. Nevertheless, any network topology is allowed since the architecture is network (transport) neutral. However, if the underlying network provides lower latency and higher bandwidth the whole architecture will deliver better performance. This approach yields to the higher data rate and I/O performance compared to previously described legacy SAN system.

Preferably the present invention is implemented in firmware running over a multitasking pre-emptive Real Time Operating System (RTOS) on hardware platform comprised of one or more embedded Central Processing Units (CPUs), possibly Application-Specific Integrated Circuits (ASIC), or Field-Programmable Gate Arrays (FPGA), a Random Access Memory (RAM), and programmable input/output (I/O) interfaces. It is to be appreciated that the various processes and functions described herein may be either part of the hardware, embedded microinstructions running on the hardware, or firmware (embedded software) executed by the RTOS. However, it should be further understood that the present invention might be implemented in various other forms of hardware, software, firmware, or a combination thereof.

FIGS. 5A and 5B are high-level block diagrams that illustrate software layers inside the system software on the host side and Front-End and Back-End layers specific for legacy RAID and Storage Area Network controller. Certainly, there are more than just Front-End and Back-End layers in a SAN software architecture however; this is not relevant for understanding of the concepts used in this invention.

SCSI standard defines the device model and SCSI command set for all SCSI devices (please see FIG. 7A). The SCSI command set is designed to provide efficient peer-to-peer operation of SCSI devices (disks, tapes, printers, etc.) by an operating system. The SCSI command set provides multiple operating systems concurrent control over one or more SCSI devices. However, proper coordination of activities between the multiple operating systems is critical to avoid data corruption. Commands that assist with coordination between multiple operating systems are described in the SCSI standard.

FIG. 6, is a high-level block diagram that illustrates how Front-End and Back-End code are executed in parallel and independently on FE_SAN and BE_SAN controllers. Even though, SCSI standard provides methods for a number of hosts (operating systems) concurrently accessing and asserting control over SCSI devices, in a complex system such as the one shown on the FIG. 6 that may not be sufficient. If there was no mechanism to internally enforce atomic execution for read, write, and some other commands, the data integrity could be jeopardized. Consequently, such locking mechanism that provides atomicity has to be built in to the system. The issue is that some kind of the actions (requests or commands) that have to be atomic must not be executed until it is safe to do so.

Atomic execution for some commands in the system from FIG. 6 is essential part of the invention since it protects the data integrity. Front-End code, generally, performs command processing and Virtual Block Address (VBA) translation to Logical Block Address (LBA) and sends them to the appropriate BE_SAN controllers. The Back-End code, then, checks whether the command could be executed immediately or not. The command may have to be queued for later execution, or yet BUSY signal could be returned to the Front-End code. Since, the Front-End and Back-End codes execute asynchronously before a command that requires atomic execution, such as writing to device media, could be started all the requirements for successful command completion have to be met.

For example, to ensure correct execution of a WRITE command, LBAs that data have to written to have to be locked and off limit to other WRITE or READ commands. That means that WRITE command has to be executed atomically. The Front-End code will examine the command; determine that a WRITE command had been received. Then it will send a LOCK request to the appropriate BE_SAN controllers to acquire distributed lock. Back-End code will respond acknowledging successful locking of the requested LBAs. At this point, it is safe to write to the locked LBAs, LBAs usually spread across multiple disk drives. Upon the successful completion of the WRITE command, the LOCK is removed by the Front-End code. There are some other commands that might require atomic execution; however the same locking mechanism could be used for those commands.

Previously described method would not permit concurrent writes to occur to the same LBAs which would limit the write performance to a single file. Indeed, it is not possible to actually write data to a disk media simultaneously from two different and independent sources without having a risk of actually corrupting the data. However, if sufficient buffer space is available at BE-SAN controllers the data that have to be written from number of different hosts (initiators) could be concurrently spooled into pre-allocated independent memory buffers without risking data corruption. To achieve this kind of parallelism on a WRITE request FE_SAN controller will request a LOCK for all LBAs that have to be written to. If currently there are no other writers, the LOCK will be granted. However, if there is another writer holding a LOCK, every BE_SAN controller has to be written to will check if there is sufficient buffer space to satisfy the request. If the request could be satisfied a tagged-LOCK will be issued and the data transfer from the host to the allocated buffer would be initiated. The actual writes to the disks would be done in the order that tagged-LOCKs are granted. If the Front-End code for some reason was unable to acquire a LOCK on all the LBAs it needs it will release all already locked LBAs and start the process all over again. In case that default number of attempts is exceeded upper management software layers will resolve the issue by verifying the reason for the unsuccessful locking.

An additional advantage is that the LOCKs are associated with LUNs using specific ID (identifiers). Therefore, Back-End code would not have to search through long LOCK tables to discover whether a command (request) could be executed or not. Another advantage is that only LBAs that are locked out might be inaccessible during that time. All other LBAs are accessible allowing greater level for parallelism.

The actual implementation may vary due to use of some specific hardware or of the shelf software. However, the principal architecture would not change. It would be relatively straight forward to use of the shelf inexpensive but not limited to x86 hardware platform with embedded RT OS or embedded Linux OS on it for the BE_SAN controllers since great deal of functionality is already available. For the FE_SAN controllers the same platform could be used as for the BE_SAN controllers. However, if AS or Myrinet network is the interconnect of choice between FE_SAN and BE_SAN controllers it would be natural to use of the shelf or modified PCIe single board computer or Myrinet interface cards to execute Front-End code on them. For entry-level systems, where the cost is more important than performance, the Front-End code could be embedded in the device driver.

In an embodiment, individual storage units such as hard disk drives 902, 904, 906, 908, 910 are coupled to back-end storage controller (BE_SAN) 912. Further, individual storage units such as hard disk drives 922, 924, 926, 928, 930 are coupled to at least a second back-end storage controller (BE_SAN) 932. Both BE_SANs 912, 932 are coupled to be accessed through network 940 from at least one or more FE_SAN controller 942, 944. Further, each FE_SAN is coupled to at least one host computer 950, 952.

FIG. 9 illustrates virtual disks that span multiple disk drives, such as virtual disks 954, 956, 958. In an embodiment, virtual disk 954 uses hard disks 902, 904, 906, virtual disk 956 uses hard disks 908, 910, 922—spanning two BE_SANs, and virtual disk 958 uses hard disks 924, 926, and 928. Hard disk 930 is initially a hot spare storage device. Virtual disk 954 is configured as a RAID (redundant array of independent disk drives) storage system. In normal operation, storage references to virtual disk 954 are processed in part by BE_SAN 912 executing RAID code 970 on a processor, such as a CPU of BE_SAN 912. RAID code 970 includes code for writing physical drives, such as drives 902, 904, 906, recognizing failed disk drives, for reconstructing data read from functioning drives and transmitting that data through network 940 to an accessing FE_SAN, all as per specifications for one or more of RAID modes 1, 10, 2, 3, 4, 5 and 6 as known in the art of RAID storage systems. In a particular embodiment, virtual disk 954 is configured to operate as a RAID-5 mode virtual disk, with block-level striping and distributed parity, such that redundancy is minimized but data is recoverable even if one drive used by virtual disk 954 has failed. In an alternative embodiment, virtual disk 954 is configured to operate as a RAID-6 mode virtual disk system.

In an embodiment, virtual disk 958, operating with drives 924—926, 928, on the second BE_SAN 932, is also configurable as a RAID, in an embodiment a RAID-5 mode virtual disk, and in an alternative embodiment a RAID-6 mode virtual disk.

Some existing RAID controllers, including some operable in RAID-5 or RAID-6 modes, have the ability to reconstruct data onto a replacement hard disk from remaining disks used by a RAID dataset or virtual disk; in these systems, once a failed disk has been replaced with a spare disk, data is reconstructed onto the spare disk. Once data is reconstructed onto the spare disk-which becomes a formerly-spare disk, redundancy is restored and, should a second disk used by the RAID virtual disk fail in turn, data can once again be reconstructed from still-functioning disks (which may include the formerly-spare disk) and provided to host systems.

A "hot spare" is a disk that is attached to a RAID controller, and unused by existing configured virtual disks. When a disk containing part of data of a RAID virtual disk fails, the "hot spare" may be substituted for the failed disk without requiring that a technician physically replace the failed disk. In some systems this replacement may require operator intervention, and in other systems a hot-spare may be substituted for a failed disk automatically. Once a hot-spare is substituted into a RAID dataset or virtual disk, data may be reconstructed onto the hot-spare—which becomes a formerly-spare disk and redundancy may be restored. Typically, however, the hot-spare must be attached to the same RAID controller as the failed drive.

In an embodiment of the invention, a hot-spare 930 is provided on BE_SAN 832. Should a physical disk drive associated with a RAID virtual disk, such as disk 926 of RAID virtual disk 958, that is attached to the same BE_SAN 932, the hot-spare may be substituted for disk 926 of RAID virtual disk 932. Consider a situation where a physical disk drive, such as drive 904, attached to a different BE_SAN, such as BE_SAN 912, is the physical hard disk that fails. In traditional RAID systems, a hot-spare attached to a different RAID controller than a failed drive is not accessible to replace that failed drive, and redundancy can not be restored until a technician replaces the failed drive.

In the embodiment of the invention, as illustrated in FIGS. 9 and 10, if no hot-spare is located on the same BE_SAN 912 as the failed drive, such as drive 904, forwarding code within RAID code 970 intercepts communications typical of those addressed to a hot spare, including those required for reconstruction of data on the hot-spare as required to restore redundancy, and relays those communications through network 940, and through a BE_SAN, such as BE_SAN 932, that has a hot-spare, and to that hot-spare, such as hot spare 930. While such operation may in some embodiments be slower than those where all physical drives associated with a RAID mode 5 or 6 virtual disk are attached to the same BE_SAN, this forwarding is sufficient to allow redundancy to be restored and permit reliable system operation until the system can be repaired. Further, this forwarding permits operation of both non-RAID and RAID virtual disks, such as RAID virtual disk 956, that span physical hard drives associated with more than one BE_SAN.

In this embodiment of the invention, one hot-spare may be provided for two or more BE_SANs, and that hot-spare may be used to restore redundancy and reliable operation regardless of which single physical hard disk attached to any of the two or more BE_SANs has failed.

Further, the system may be configured to implement BE_SAN-spanning virtual volumes, such that one or more physical disks drive associated with a virtual volume hosted by a first BE_SAN, such as BE_SAN 912 may be coupled instead to a second BE_SAN, such as BE_SAN 932; the first BE_SAN 912 recognizes that a particular disk access to a particular logical block is to a physical sector on a drive on the second BE_SAN 932 and relays communications over the network 940 and through the second BE_SAN 932, in a manner similar to that required for use of a drive on the second BE_SAN as a hot-spare for a RAID set hosted primarily by the first BE_SAN.

The foregoing description should not be taken as limiting the scope of the disclosure. It should thus be noted that the matter contained in the above description or shown in the accompanying drawings should be interpreted as illustrative and not in a limiting sense. The following claims are intended to cover generic and specific features described herein, as well as all statements of the scope of the present method and system.

What is claimed is:

1. A data processing system comprising:
at least a first and a second Front End SAN controller (FE_SAN), including a data memory, each FE_SAN physically co-located with a host CPUs and interconnected via a host system bus to the co-located host CPU;
at least a first and a second Back End SAN controller (BE_SAN), each BE_SAN interconnected via at least one back-end network to a plurality of storage devices;
a network fabric interconnecting the FE_SAN controllers with the BE_SAN controllers;
and SAN virtualization firmware executing on the FE_SAN controllers and the BE_SAN controllers configured to request data from a particular BE_SAN of the at least {a} first and {a} second BE_SANs when data is required by a host CPU wherein the SAN virtualization firmware of the FE_SAN requests a write lock from one of the at least first and second BE_SAN controllers on receiving a write command from the host, upon grant of write lock by the BE_SAN the FE_SAN writes data to the BE_SAN for writing to an appropriate storage device, and releases the write lock on completing writing of data to the BE_SAN and wherein the particular BE_SAN is configured to recognize writes to a failed storage device of the plurality of storage devices attached thereto, and to relay those writes through a different BE SAN controller to a second storage device attached to the different BE_SAN controller, wherein the BE_SAN includes access control firmware configured to restrict read or write access to specific locked logical block addresses (LBAs) during writes to prevent data corruption while allowing concurrent unrestricted access to other unlocked logical blocks; and wherein, whenever the first and second FE_SAN request simultaneous write lock to a same logical block address, the BE_SAN grants a lock request to the first FE_SAN when its buffer has sufficient space for the indicated amount of data of the first FE_SAN's write lock request or when the appropriate storage device is available for writing; and wherein the BE_SAN grants simultaneous write lock to the second FE_SAN when the BE_SAN has sufficient buffer space available both for the indicated amount of data of the first FE_SAN's write lock request and for an indicated amount of data of the second FE_SAN's write lock request.

2. The system of claim 1 further comprising RAID code executing on a particular BE_SAN configured to operate at least one virtual dataset as a RAID dataset; wherein the RAID code is configured to use the second storage device as a hot-spare for the RAID dataset.

3. The system of claim 2 wherein the RAID code is configured to reconstruct data of the failed storage device onto the second device to restore redundancy to the RAID dataset.

4. The system of claim 2 wherein the BE_SAN includes access control firmware configured to restrict read or write access to specific locked logical block addresses (LBAs) during writes to prevent data corruption while allowing concurrent unrestricted access to other unlocked logical blocks; and
wherein, whenever the first and second FE_SAN request simultaneous write lock to a same logical block address, the BE_SAN grants a lock request to the first FE_SAN when its buffer has sufficient space for the indicated amount of data of the first FE_SAN's write lock request or when the appropriate storage device is available for writing;
and wherein the BE_SAN grants simultaneous write lock to the second FE_SAN when the BE_SAN has sufficient buffer space available both for the indicated amount of data of the first FE_SAN's write lock request and for an indicated amount of data of the second FE_SAN's write lock request.

5. A data processing system comprising:
at least a first and a second Front End SAN controller (FE_SAN), including a data memory, each FE_SAN physically co-located with a Host CPU and interconnected via a host system bus to a co-located host CPU;
at least a first and a second Back End SAN controller (BE_SAN), each BE_SAN interconnected via at least one back-end network to a plurality of storage devices;
a network fabric interconnecting the FE_SAN controllers with the BE_SAN controllers;
and SAN virtualization firmware executing on the FE_SAN controllers and the BE_SAN controllers configured to request data from a particular BE_SAN of the at least a first and a second BE_SANs when data is required by a host CPU;

wherein the BE_SAN includes access control firmware configured to restrict read or write access to specific locked logical block addresses (LBAs) during writes to prevent data corruption while allowing concurrent unrestricted access to other unlocked logical blocks; and the BE_SAN access control firmware is configured such that whenever the first and second FE_SAN request simultaneous write lock to a same LBA, the BE_SAN is configured to grant a lock request to the first FE_SAN when its buffer has sufficient space for the indicated amount of data of the first FE_SAN's write lock request or when the appropriate storage device is available for writing;

and the BE_SAN is configured to grant simultaneous write lock to the second FE_SAN when the BE_SAN has sufficient buffer space available both for the indicated amount of data of the first FE_SAN's write lock request and for an indicated amount of data of the second FE_SAN's write lock request.

6. A method of operating a data processing system, the data processing system comprising:

at least a first and a second Front End SAN controller (FE_SAN), including a data memory, each FE_SAN physically co-located with a Host CPU and interconnected via a host system bus to at least one co-located host CPU;

at least a first and a second Back End SAN controller (BE_SAN), each BE_SAN interconnected via at least one back-end network to a plurality of storage devices;

a network fabric interconnecting the FE_SAN controllers with the BE_SAN controllers;

transmitting a first write lock request from the first FE_SAN controller to a particular BE_SAN controller of the BE_SAN controllers, the write lock request incorporating a first write size;

granting the first write lock request upon a condition selected from the group consisting of the BE_SAN having sufficient buffer space to hold written data of the write size, and an appropriate storage device of the plurality of storage devices being available for writing;

transmitting a second write lock request from the second FE_SAN controller to the particular BE_SAN controller, the second write lock request incorporating a second write size;

granting the second write lock request without waiting to close the first write lock grant upon a condition that the particular BE_SAN controller have sufficient buffer space to hold written data of the first write size in addition to written data of the second write size.

7. The method of claim 6 further comprising:

identifying, in the particular BE_SAN controller, that a particular write request references a logical block address associated with a failed storage device of the plurality of storage devices coupled to the particular BE_SAN controller; and forwarding the particular write request to a different BE_SAN controller of the BE_SAN controllers to write to a storage device coupled to the different BE_SAN controller.

* * * * *